United States Patent [19]

Weilbacker et al.

[11] Patent Number: 4,471,458

[45] Date of Patent: Sep. 11, 1984

[54] COMPUTER INTERFACE

[75] Inventors: Thomas O. Weilbacker, Northvale; Joseph A. Guglielmo, Rockaway, both of N.J.

[73] Assignee: Allied Corporation, Morris Township, Morris County, N.J.

[21] Appl. No.: 274,954

[22] Filed: Jun. 18, 1981

[51] Int. Cl.³ .............................................. G06F 3/00
[52] U.S. Cl. .................................................. 364/900
[58] Field of Search .............. 364/130, 131, 132, 550, 364/551, 200 MS File, 900 MS File, 900, 200

[56] References Cited

U.S. PATENT DOCUMENTS 3,581,286  5/1971  Beausoleil .......................... 364/200
4,309,754  1/1982  Dinwiddie, Jr. .................... 364/200

OTHER PUBLICATIONS

*Microprocessors/Microcomputers: an Introduction;* Givone, Donald, McGraw Hill Book Co., New York, 1980.

*Fujitsu Scientific & Technical Journal,* vol. 15, No. 4, Dec. 1979, Japan, "GP-1B Interface Adaptor Using a Microprocessor (MB8871)," T. Kasahara, T. Kouno and T. Nakagami, pp. 45-57.

*IEEE Transactions on Instrumentation and Measurement,* vol. 1M-29, No. 2, Jun. 1980, "The Design and Construction of a General Purpose Lab. Data Acquisition System," D. A. Lowther, C. B. Giles, I. C. Leszkowicz.

*MC 6801 Reference Manual,* 1st Ed., Motorola, 1980, pp. Ch1: 1,2,5; Ch3: 37-46.

*Intel the 8086 Family User's Manual,* Intel, 1979, (9800722-03), pp. Ch1: 1-11, Ch2: 1-6, Ch3: 1-14, Ch4: 38-52, pp. Appendix A: 4-17.

*Primary Examiner*—Gareth D. Shaw
*Assistant Examiner*—Oleg Schatoff
*Attorney, Agent, or Firm*—Stanley N. Protigal; Anthony F. Cuoco; Thomas L. Adams

[57] ABSTRACT

An interface (10) between a first (MC, 30) and second (SC) computer employs a multiplexer (46) and a coupler (48, 50). The first (MC, 30) and second (SC) computers have a first (LA/B, LEX0-15) and second (CX1-21, CA1-15) plurality of information lines, respectively. These computers also each have a group of control lines (36, 42). The multiplexer (46) is connected to the first and second plurality of information lines (LA/B, LEX-0-15, CX1-21, CA1-15). The multiplexer (46) is operable to separately switch each of a predetermined group (LEX12-15) within the first plurality (LA/B, LEX-0-15) between either member of a different corresponding pair within the second plurality (CX1-21, CA1-15). The multiplexer (46) is also connected to at least one (ESELCX) of the control lines (36) of the first computer (MC, 30). The multiplexer (46) can switch the predetermined group (LEX12-15) in response to a signal on the control lines (ESELCX) of the first computer (MC, 30). The coupler (48, 50) is connected to a given assemblage (CX1-20) within the second plurality (CX1-21, CA1-15) and to a predetermined set (LBIN-1-15, LAIN12-15) within the first plurality (LA/B, LEX0-15). The coupler (48, 50) is operable to transmit signals to the second plurality (CX1-21, CA1-15) from the predetermined set (LBIN1-15, LAIN12-15).

8 Claims, 3 Drawing Figures

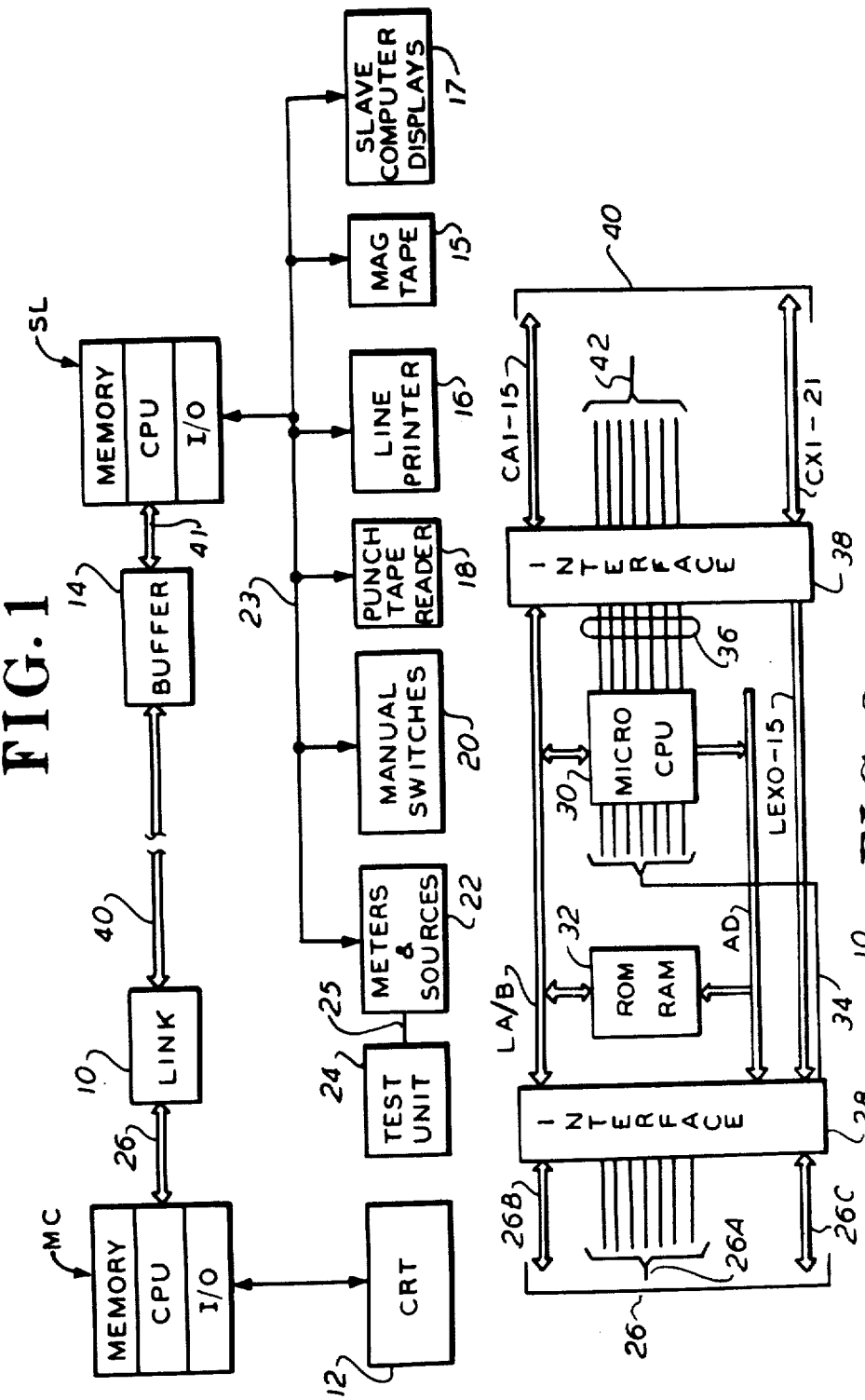

COMPUTER INTERFACE

BACKGROUND OF THE INVENTION

The present invention relates to computer interfaces and, in particular, to equipment and methods for effecting communication between computers which may have incompatible information lines.

It is known to time multiplex data so that one set of lines can carry more than one channel of information. Communication between different computers is also known. Such communication requires equipment for interfacing data lines and/or address lines which may be incompatible. Often the larger of the two computers has more lines, for transmitting more precise data than the other computer is capable of receiving. However, known computer interfacing systems as yet have not considered the advantages flowing from using alternate channels for transmission and reception, together with multiplexing.

Accordingly, there is a need for a simple interface between two computers that allows a full and accurate transmission of information.

SUMMARY OF THE INVENTION

In accordance with the illustrative embodiments demonstrating features and advantages of the present invention, there is provided an interface between a first and second computer. The interface includes a multiplexing means and a coupling means. The first and second computer have a first and second plurality of information lines, respectively. Also, these computers each have a group of control lines. The multiplexing means is connected to the first and second plurality of information lines. This multiplexing means is operable to separately switch each of a predetermined group within the first plurality between either member of a different, corresponding pair within the second plurality. The multiplexing means also is connected to at least one of the control lines of the first computer. The multiplexing means can switch the predetermined group in response to a signal on the control lines of the first computer. The coupling means is connected to a given assemblage within the second plurality and to a predetermined set within the first plurality. The coupling means is operable to transmit signals to the second plurality from the predetermined set.

Also, in accordance with the present invention, a method for interfacing a first and second computer is provided. The first and second computers have a first and second plurality of information lines, respectively. Also, these computers each have a group of control lines. The method includes the step of freely transmitting data between the first and second information lines by alternately transmitting from a first portion of and to a remaining portion of said first plurality of information lines. The method also includes the step of time multiplexing data from a given number of the second plurality onto a lesser number of said first plurality.

By employing such equipment and methods a relatively simple and effective interface is provided. This interface can couple a large number of information lines of one computer to another computer having fewer lines by grouping the larger number into two sets: one for transmission and one for reception. In one embodiment, the selection of transmission or reception is controlled by the computer having the greater number of information lines. Also, in one embodiment, the computer having fewer information lines has a subset of them time multiplexed to the other computer.

It is also expected that in some embodiments, the computer having the greater number of information lines may have a portion of them routed through a register to eventually couple into the address lines of the other computer having fewer information lines. In a preferred embodiment, this register is partitioned into an input and output register, data being clocked between the registers by control lines from each computer.

In one embodiment, the second computer is used to control one or more test instruments. Preferably, the first computer can transmit instructions concerning the manner, sequence and parameters of testing to the second computer, which then executes those instructions.

BRIEF DESCRIPTION OF THE DRAWINGS

The above brief description as well as other objects, features and advantages of the present invention will be more fully appreciated by reference to the following detailed description of a presently preferred but nonetheless illustrative embodiment, in accordance with the present invention, taken in conjunction with the accompanying drawings wherein:

FIG. 1 is a block diagram of an interface between two computers according to the present invention;

FIG. 2 is a more detailed block diagram of a portion of the system of FIG. 1.

DETAILED DESCRIPTION OF THE PREFERRED EMBODIMENT

Figure 3:
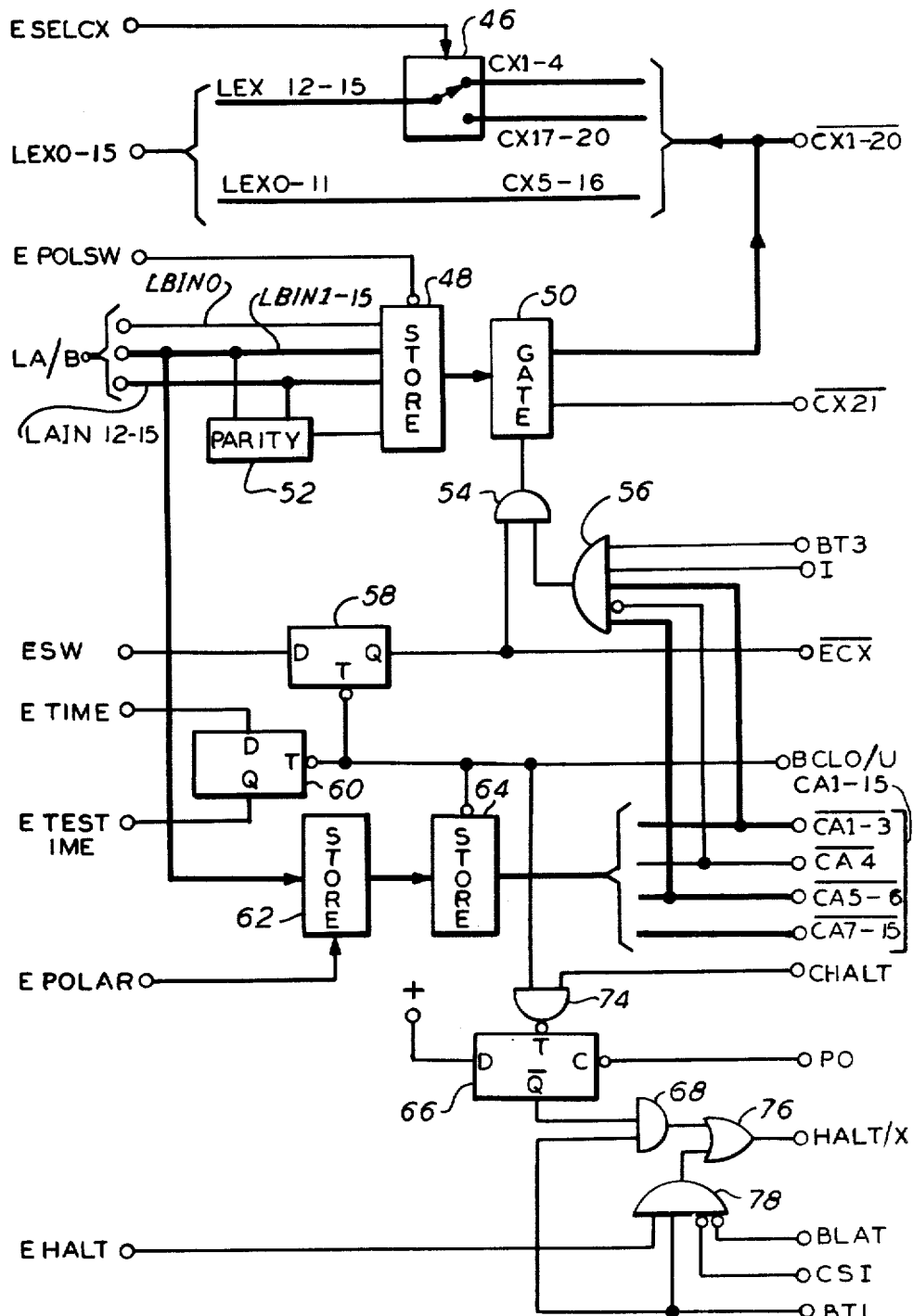
FIG. 3 is a more detailed schematic diagram of the interface of FIG. 2.

Referring to FIG. 1, an interface is shown herein as link 10 connected to a first computer, general purpose computer MC. Computer MC includes memory, a central processing unit (CPU) and an input/output port (I/O). First computer MC is shown communicating with cathode ray tube 12. Interface link 10 also connects through lengthy cable 40 (for example, 100 feet long) to buffer device 14. Device 14 acts primarily to restore signals which may have been attenuated through cable 40. Buffer 14 is connected to second computer SL shown employing a memory, a central processing unit (CPU) and an input/output port (I/O), all having a known structure. Second computer SL is also shown connected by bus 23 for communication with several peripherals: line printer 16, punch tape reader 18, magnetic tape memory 15, computer displays 17, manual programming switches 20 and a group of measuring instruments and stimulative electrical sources 22. Instruments and sources 22 are a rack of equipment connected to line 23 which is referred to herein as an instrumentation terminal. In this embodiment, the second computer SL controls instruments and sources 22 to perform certain programmed tests on unit 24.

For example, equipment 22 may inject through lines 25 a precise current into a test terminal of unit 24, while simultaneously measuring the voltage at that test terminal. Of course, other parameters can be measured, such as current, frequency, power, etc. In this embodiment, first computer MC can send instructions through link 10 and buffer 14 to second computer SL to change its manner of operation. For example, first computer MC can transmit a new program which second computer SL will then execute. Alternately, first computer MC instructs second computer SL to execute its currently stored program one step at a time, pausing after each step. Also, first computer MC can inspect the memory of second computer SL and either change or display data at selected addresses.

Referring to FIG. 2, previously illustrated link 10 is shown herein in further detail. A group of lines 26 that are internal to the previously mentioned first computer (computer MC of FIG. 1) connect to interface device 28 which is also internal to that first computer. Lines 26 consist of conventional control lines 26A, data lines 26B and address lines 26C. Interface 28 connects to address lines AD which are bussed to a microprocessor 30 and memory subsystem 32, the latter comprising a group of read only and random access memories. Microprocessor 30 and memory 32 can exchange data with data line LA/B which also connects to interface 28. A group of control lines 34 from microprocessor 30 connects to interface 28. Microprocessor 30 also has another group of control lines 36 separately connected to interface 38. Interface 38 has a group of sixteen data lines LEX0-15 which together with data lines LA/B form a group referred to herein as a first plurality of information lines. The other lines 40 from interface 38 connect to the previously mentioned second computer (computer SL of FIG. 1). Lines 40 include a second plurality of information lines CX1-21 (comprising 21 lines in this embodiment) control lines 42 and fifteen address lines CA-1-15. As will be described in further detail hereinafter, interface 38 transmits data on lines LEX0-15 and CA-1-15. Interface 38 also exchanges data with data lines LA/B and CX1-21. It will be noted that in this embodiment, the foregoing data lines are incompatible.

Referring to FIG. 3, the previously mentioned interface (interface 38 of FIG. 2) is shown herein in further detail. It will be appreciated that previously illustrated data lines CX1-21 are broken down into various groups: single line CX21, twenty lines CX1-20 (the latter group being broken down into four lines CX1-4, twelve lines CX5-16 and four lines CX17-20). Similarly, previously mentioned address lines CA1-15 are broken down as follows: triple lines CA1-3, single line CA4, double lines CA5-6 and nine lines CA7-15. It will be understood that the bars atop reference numerals in this and other figures indicate that the logical signals thereat have been inverted by an inverter (not shown). Also, previously mentioned data lines LEX0-15 are shown partitioned into four lines LEX12-15 and twelve lines LEX0-11, the latter separately connecting to lines CX5-16. In addition, previously mentioned data lines LA/B are shown partitioned into single line LBIN0, fifteen lines LBIN1-15 and four lines LAIN12-15. The other lines illustrated on the left of FIG. 3 comprise control lines of the previously illustrated group (control lines 36 of FIG. 2). The remaining lines to the right of FIG. 3 comprise control lines among the previously illustrated group (lines 42 of FIG. 2).

A multiplexing means is shown schematically illustrated as switching device 46. Device 46 comprises four switches for switching four lines LEX12-15 from predetermined group LEX0-15. (This illustration shows only one of the four switches for clarity). Each of the switches 46 have a pair of switched input terminals, one each from the two groups CX1-4 and CX17-20. Each of the switches 46 transfer simultaneously in response to a signal on at least one of the previously mentioned control lines (control lines 42 of FIG. 2); in this embodiment, control line ESELCX.

A coupling means is shown herein as a storage means 48, in this embodiment a group of registers. Registers 48 connected to a gate means 50, in this embodiment a group of gates that can either block or relay the information in registers 48 through to line CX21 and twenty lines CX1-20. Register 48 stores the data from a predetermined set of lines shown herein as line LBIN0, lines LBIN1-15 and lines LAIN12-15. Register 48 also stores a parity bit produced from parity generator 52. Generator 52 has input lines connected to lines LA/B to produce a parity bit in a conventional fashion. This parity bit is ultimately passed through devices 48 and 50 to appear on line CX21. Data on lines LA/B is stored by registers 48 in response to a signal on a given one of the control lines, in this embodiment control line EPOLSW.

Gate 50 transmits the data stored in register 48 in response to a command signal produced by AND gate 54. Gate 54 has one input connected to the output of AND gate 56 and its other input connected to output Q of D-type flip-flop 58. Input D of flip-flop 58 connects to a predetermined one of the control lines, specifically control line ESW. Its trigger input T connects to a secondary one of the control lines, specifically control line BCL0/U. Flip-flop 58 operates in a conventional manner whereby its output Q (control line ECX) matches input D when a triggering input is received on its input T. Six of the inputs of AND gate 56 are separately connected to six of the address lines, namely, lines CA1-3, line CA4 and lines CA5-6, line CA4 being connected to an inverting input of gate 56. The two remaining inputs of gate 56 separately connect to control lines BT3 and I. Flip-flop 58 is herein referred to as a timing means.

Coordination of events between the computers is established by D-type flip-flop 60, whose output Q, input D and input T connect to control lines ETES-TIME, ETIME and BCL0/U, respectively. A register means is shown herein as primary register means 62 and secondary register means 64 which are, in this embodiment, two separate groups of conventional registers. Register 62 connects to cluster of lines LBIN1-15 to store data appearing thereon. Register 62 stores that information in response to a signal on a primary one of the control lines, specifically, control line EPOLAR. Data thus stored in register 62 can be transferred to secondary register 64 in response to a signal on a secondary one of the control lines, specifically, line BCL0/U. Data thus stored in register 64 can be transmitted over address lines CA1-15.

A bistable means concerned with transferring halt commands between computers is shown herein as D-type flip-flop 66 having its D input, C input and $\bar{Q}$ output connected to positive potential, control line P0, and one input of AND gate 68, whose other input connects to control line BTL. The T input of flip-flop 66 connects to the output of NAND gate 70 which has one input connected to line BCL0/U and the other input connected to a preemptive one of the control lines, specifically, control line CHALT. The output of AND gate 68 is connected to one input of OR gate 76 whose other input is connected to the output of AND gate 78 which is referred to herein as a halt logic means. The output of OR gate 76 is identified herein as control line EHALT (a given one of the control lines from the first computer) and control lines BTL, CSI and BLAT, the latter two being inverted inputs of gate 78.

To facilitate the understanding of the principles associated with the foregoing apparatus the operation of the equipment of FIGS. 1 and 2, will be initially described, followed by a specific operational description of FIG. 3. A unit under test 24 is connected through lines 25 to the measuring and stimulating devices 22. Before starting, if desired, programming instructions can be fed into second computer SL by operating a tape reader 18 for quick feeding or by actuating manual switches 20 to transmit individual programming words. In this mode, second computer SL can through line printer 16 or teletypewriter 18 transmit acknowledging responses, inquiries and error signals. However, it is usually simpler for first computer MC to transmit programming information through link 10 and buffer 14.

Because first computer MC is, in this embodiment, a large, general-purpose computer employing many interactive devices such as cathode ray tube 12, initial programming and debugging can be performed more simply and rapidly by dispatching programming instructions from first computer MC. A keyboard associated with cathode ray tube 12 can be used to assemble instructions while its video screen displays the program as well as programming errors. First computer MC transmits this program over lines 26 through interface 28 (FIG. 2). Microcomputer 30 then sends corresponding control signals on lines 34 and address signals on lines AD directing the transmittal of this program along lines LA/B and into memory 32. Subsequently, the program is retransmitted on lines LA/B through interface 38 onto lines CX1-21 to program second computer SL (FIG. 1).

Also, first computer MC (FIG. 1) may be used to troubleshoot a unit 24. The second computer SL, once programmed, can sequence unit 24 through a series of tests performed by instruments 22 and thereby compile data on the responses and operating parameters of unit 24. Thereafter, an inspector may wish to perform additional tests to refine his diagnosis. Accordingly, an inspector may send from first computer MC instructions to operate certain instruments and stimulating devices in rack 22 and return the associated measurements, as follows: Instructions are initially conveyed on lines 26 (FIG. 2) through interface 28, microprocessor 30 and interface 38, to lines 40. The instructions thus conveyed are coupled through buffer 14 (FIG. 1) to cause second computer SL to operate the appropriate instruments and stimulating devices in rack 22 (FIG. 1), perform the requested tests and return on lines 23 the requested measurements. Second computer SL then conveys this information through buffer 14 and line 40 to link 10. This returning information is transmitted on information lines CX1-21 through interface 38 (FIG. 2) onto data lines LEX0-15. Thereafter, the information is relayed through interface 28 to first computer MC on lines 26 so they may be displayed on cathode ray tube 12 (FIG. 1).

Another desirable feature provided by the system of FIGS. 1 and 2 is the display and rewriting of information in the memory of second computer SL. Also, real-time debugging can be performed by means of the first computer. In both of the latter instances, the flow and return of instructions and data is similar to that previously described.

The manner in which information crosses interface 38 (FIG. 2) is best understood by reference to FIG. 3 whose operation will be presently described. First computer MC (FIG. 1) can transmit data through interface 38 (FIG. 2) in several fashions. Data can be transmitted over lines LA/B through two alternate paths depending upon whether data is to be received on data lines CX1-20 or address lines CA1-15. Initially, first computer MC (FIG. 1) awaits reception of a signal originating from one of the control lines 36 (FIG. 2) of microprocessor 30 that second computer SL (FIG. 1) is ready to accept data and able to start a new cycle. If first computer MC (FIG. 1) wishes to transmit data to data lines CX1-20 (FIG. 3), it relays data onto lines LA/B and, in response, parity generator 52 supplies an additional parity bit which is applied together with the twenty other bits of lines LA/B to the inputs of register 48. First computer MC (FIG. 1) produces a control signal on lines 26A that causes microprocessor 30 (FIG. 2) to produce a signal on line EPOLSW (FIG. 3) to cause the transmitted data on line LA/B and from generator 52 to be stored in register 48. Thereafter, to allow settling, a valid data signal is transmitted on control line ESW (FIG. 3) to input D of flip-flop 58. The next timing pulse from the second computer on line BCL0/U, sets flip-flop 58 to produce a high signal on its output Q (line ECX) which is applied to one input of AND gate 54. This will allow gate 50 to transmit data to lines CX1-20 and line CX21 when a high, enabling signal is transmitted from the output of AND gate 56, at a time when second computer SL (FIG. 1) is ready. This enabling signal is produced when proper control signals are produced on lines BT3 and I and when a specific address on lines CA1-15 is decoded by AND gate 56. In this fashion, data is then timely transmitted so that data from first computer MC is stored in register 48 when the first computer is ready and data is transmitted out of register 48 when second computer SL is ready to receive such data.

An alternate transmission path is provided for lines LBIN1-15 to address lines CA1-15 through registers 62 and 64. This transfer occurs when first computer MC (FIG. 1) sends data through microprocessor 30 (FIG. 2) to lines LBIN1-15 together with an enabling signal on terminal EPOLAR, causing register 62 to store the data transmitted to its inputs. It will be appreciated that the control signal on line EPOLAR, originating from first computer MC (FIG. 1) is not generated unless an appropriate ready signal is received from the second computer through control lines within group 42 (FIG. 2). This data stored in register 62 is then clocked into register 64 by the next timing pulse on control line BCL0/U from second computer SL (FIG. 1), causing a transfer of data to address lines CA1-15 from register 64.

Data may be returned to first computer MC (FIG. 1) from lines CX1-20 (FIG. 3) by way of data lines LEX-0-15 of the first computer. However, in this instance, data lines CX1-20 are more numerous than data lines LEX0-15. For this reason, 8 of the transmitting data lines CX1-4 and CX17-20 are time multiplexed through multiplexer 46. Basically, data is sent continuously through lines CX5-16 to lines LEX0-11 while the data to lines LEX12-15 is received in two serial sets. This multiplexing is sequenced by control line ESELCX originating from first computer MC (FIG. 1). This control signal causes each of the multiplexing switches in multiplexer 46 to simultaneously transfer between their associated lines.

An important signal conveyed between the above computers is a halt signal originating from first computer MC (FIG. 1) instructing second computer SL to interrupt its current program and await new instructions, data or other controlling information originating from first computer MC (FIG. 1). The initial halt signal is transmitted on line EHALT (FIG. 3) and is applied to one input of AND gate 78. When various control and timing signals on lines BLAT, CSI and BTL are in the appropriate state then this halt signal is transmitted through AND gate 78 and OR gate 76 to terminal HALT/X. The coordination thus provided is such that second computer SL (FIG. 1) does not immediately respond to this halting instuction on line EHALT (FIG. 3) but instead continues to complete certain necessary portions of its current cycle and certain high priority preprogrammed steps before halting. This halt is acknowledged by sending an acknowledgement signal through lines 36 (FIG. 2) of microprocessor 30 and interface 28 to first computer MC (FIG. 1).

It will be observed that flip-flop 66 can produce a local halt signal in response to a halt signal on lines CHALT and a triggering signal on timing line BCL0/U. When the latter signals are high, flip-flop 66 is triggered causing output $\overline{Q}$ to become low. Thereafter, a control signal on line P0 clears flip-flop 66 causing its output $\overline{Q}$ to again become high, which high signal is transmitted through AND gate 68 and OR gate 76, provided terminal BTL is high.

First computer MC (FIG. 1) is able to receive coordinating timing information through microprocessor 30 (FIG. 2) by delivering a timing pulse on terminal ETIME to the D input of flip-flop 60 which changes state to produce a matching signal on terminal ETESTIME when the second computer delivers a triggering signal on line BCLO/U.

It is to be appreciated that various modifications may be implemented with respect to the above described preferred embodiment. For example, a different number of information and address lines may be employed depending on the chosen computers. In addition, the illustrated multiplexer may employ a greater or lesser number of switches in other embodiments. Moreover, while cascaded pairs of registers are shown, in some embodiments such controlled shifting of data is not required, so that one or more of these registers may be eliminated. It is also to be appreciated that the decoding of address lines may be altered to suit different codes. It is also anticipated that the illustrated gates, registers and bistable devices may be arranged in many alternate fashions and may be fabricated from various forms of integrated curcuits. Furthermore, the various timing lines controlling the transfer of data may originate from different computers, depending upon the application. It is also expected that the transmission and acknowledgement of halt signals may be handled in alternate sequences with alternate circuit configurations. Also, numerous circuit modifications and component substitutions are possible depending upon the desired speed, word length, power, etc.

Obviously, many modifications and variations of the present invention are possible in light of the above teachings. It is therefore to be understood that within the scope of the appended claims, the invention may be practiced otherwise than as specifically described.

What is claimed is:

1. An interface for connecting a first computer, having a first plurality of information lines and a group of control lines, with a second computer having a measuring instrument having and being operable through an instrumentation terminal, said instrument having means for coupling to an electronic article of manufacture having a plurality of testable terminals and receiving, from said plurality of testable terminal signals on said testable terminals from said electronic article of manufacture for measuring, an operating parameter of said electronic article of manufacture, the second computer having a second plurality of information lines, a plurality of address lines and a group of control lines, said second plurality of information lines being fewer in number than said first plurality of information lines, said second computer being connected to said instrumentation terminal for operating said instrument, the interface comprising:

multiplexing means connected to said first and second plurality of information lines, said multiplexing means being operable to multiplex a given number of said second plurality into a lesser number of said first plurality, said multiplexing means being operable to switch said given number of said second plurality in response to a signal on said control lines of said first computer;

coupling means connected to said second plurality and to a predetermined set within said first plurality, said coupling means being operable to transmit signals to said second plurality from said predetermined set;

storage means connected to a predetermined one of said control lines of said first computer, said storage means being connected to said first plurality of information lines for storing signals on said first plurality of information lines in response to a store signal on said predetermined one of said control lines;

gate means connected to said storage means and at least two of said address lines, one of said two of said address lines carrying a gating signal provided by said second computer, said gate means being connected to said second plurality of information lines for transmitting to said second plurality of information lines signals previously stored in said storage means in response to provision of said gating signal on said address lines from said second computer; and timing means connected to a third predetermined one of the control lines of said first computer for blocking transmission of signals stored in said storage means until a timing signal is provided on said third predetermined one of the control lines from said first computer.

2. An interface between a first and second computer having a first and second plurality of information lines, respectively, said first plurality of lines being greater in number than said second plurality of lines, said second plurality of lines being divisible into a first set of selectable pairs of lines, each pair corresponding with a different one of a second set of said first plurality of lines, said second computer having a plurality of address lines, said first and second computer each having a plurality of control lines, said second computer being operable to test an electronic article of manufacture having a plurality of testable terminals and being connected to a measuring instrument having and being operable through an instrumentation terminal, said instrument having means for coupling to and receiving from said plurality of testable terminals on said testable terminals from said electronic article of manufacture, said instrument being operable to measure an operating parameter of said electronic article of manufacture, in which interface comprises:

multiplexing means connected to said first and second plurality of information lines, said multiplexing means being operable to separately switch each one of said second set of said first plurality of information lines between either member of a different, corresponding one of said selectable pairs of said first set of said second plurality of information lines, said multiplexing means being connected to a first predetermined one of said control lines of said first computer, said multiplexing means being operable to switch said second set of first plurality of information lines in response to a signal on said control lines of said first computer; and coupling means connected to a third set of said second plurality of information lines and to a fourth set of said first plurality of information lines, said coupling means being operable to transmit signals to said second plurality of information lines from said fourth set of information lines, said coupling means including storage means connected to second predetermined one of said control lines of said first computer, said storage means being connected to said first plurality of information lines for storing signals on said first plurality of information lines in response to a store signal on said second predetermined one of said control lines;

said coupling means further including gate means connected to said storage means and at least two of said address lines, one of said two of said address lines carrying a gating signal provided by said second computer, said gate means being connected to said second plurality of information lines for transmitting to said second plurality of information lines signals previously stored in said storage means in response to provision of said gating signal on said address lines from said second computer; and timing means connected to a third predetermined one of the control lines of said first computer for blocking transmission of signals stored in said storage means until a timing signal is provided on said third predetermined one of the control lines from said first computer.

3. An interface according to claim 2 comprising:
a primary register means being connected to a fourth predetermined one of said control lines of said first computer, said primary register means being connected to a fifth set of said first plurality of information lines for storing signals on said fifth set of said first plurality of information lines in response to a signal on said fourth predetermined one of the control lines of said first computer.

4. An interface according to claim 3 comprising:
a secondary register means connected to said primary register means and to a fifth predetermined one of said control lines of said second computer, said secondary register means being connected to said address lines for transmitting to said address lines signals stored in said primary register means in response to a signal on said fifth predetermined one of said control lines of said second computer.

5. An interface according to claim 2 or 4 further comprising:
a halt logic means having a halt line, said halt logic means being connected to and responsive to signals on at least one of said control lines from each of said first and second computers for providing from said halt logic means a halt signal on said halt line, said second computer being connected to said halt line and being interruptible in response to said halt signal.

6. An interface according to claim 5 wherein said halt logic means includes
bistable means connected to a sixth predetermined one of the control lines of said second computer for causing, in response to a signal on said sixth predetermined one of the control lines on said second computer, a change in state of said bistable means; and combinational logic means connected to said bistable means, said combinational logic means being connected to a seventh predetermined one of the control lines of the first computer for providing, in response to a signal on the seventh predetermined one of the control lines of the first computer and in response to the state of said bistable means, said halt signal.

7. An interface according to claim 2 wherein said fourth set of said first plurality of information lines and said second set of said first plurality of information lines are mutually exclusive.

8. An interface according to claim 2 wherein said multiplexing means is operable to transmit signals to said second set of said first plurality of said information lines, said first computer being connected via said first plurality of information lines to said multiplexing means.

* * * * *